Patented Dec. 2, 1947

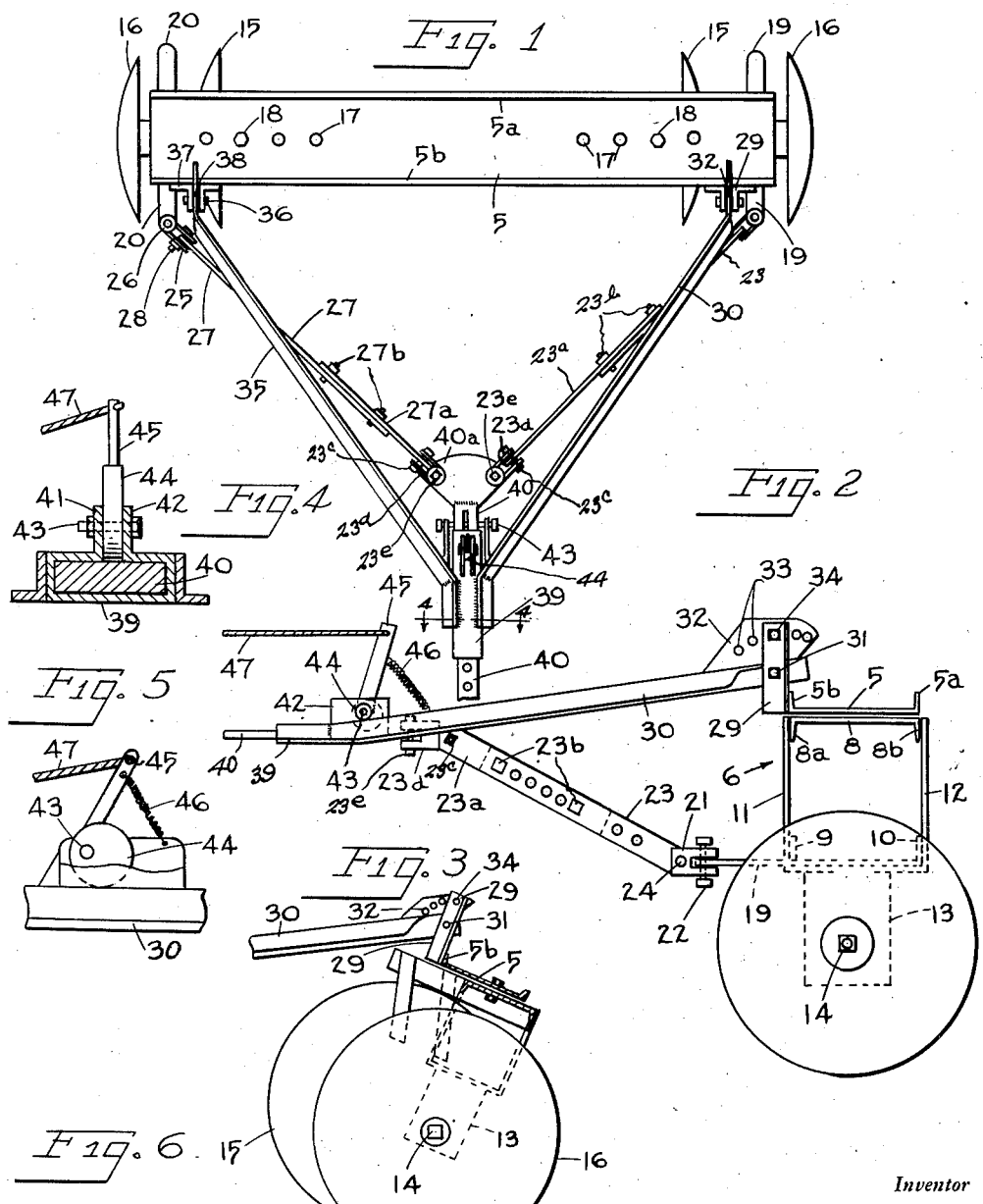

2,431,959

UNITED STATES PATENT OFFICE 2,431,959

RIDGE FORMING AND LEVELING DISC PLOW

Ray Olson and Archie Olson, Kingsburg, Calif.

Application April 11, 1945, Serial No. 587,676

5 Claims. (Cl. 97—56)

This invention relates to an improved disc plow for plowing land into ridges and then leveling the land, and involves certain improvements over the construction shown in our prior Patent No. 2,101,187, issued December 7, 1937.

One of the objects of the invention is to provide an automatic clutch for controlling the positional adjustment of the pull bars upon the draft tongue, which can be released from the operating tractor so as to control the adjustment of the plow discs to perform their different functions.

Another object of the invention is to provide an adjustable connection between the pull bars and the cross beam or base, under which the plow discs are mounted, so that different angular arrangements between the pull bars and the cross beam or base may be established and maintained.

With the above and other objects in view, the invention relates to certain new and useful constructions, combinations and arrangements of parts clearly described in the following specification, and fully illustrated in the accompanying drawings, in which:

Figure 1 is a plan view of the improved disc plow.

Figure 2 is a side elevation thereof.

Figure 3 is a fragmentary perspective view drawn on a reduced scale showing the cross beam or base tilted with reference to the pull bars.

Figure 4 is an enlarged transverse sectional view taken on line 4—4 of Figure 1.

Figure 5 is an enlarged detail side view, partly broken away, showing the automatic clutch, the box or casing, and the pull bars.

Figure 6 is a rear elevation of the plow, drawn on a reduced scale and with parts omitted.

Referring to the accompanying drawings, which show a practical embodiment of our invention, 5 designates an upper channel bar, the side flanges 5a and 5b of which project upwardly. Under this channel bar sub-frames 6 and 7 are arranged.

Each sub-frame includes an upper channel bar 8, the side flanges 8a and 8b of which project downwardly, bottom angle bars 9 and 10, and vertical front and rear plates 11 and 12, which connect the bottom angle bars to the upper channel bar 8. To the bottom of each sub-frame a bearing box 13 is secured, and each bearing box supports an axle 14, which carries the inner plow disc 15 and the outer plow disc 16, each one having a concave face on one side and a convex face on the other.

The outer portions of the upper cross beam or channel bar are formed with longitudinally spaced holes 17, any one of which is adapted to receive the pivot bolt 18, which connects the sub-frame of the adjacent side to the upper channel bar or beam 5. This pivot bolt extends through the inner end of the sub-frame inwardly of the plow discs 15 and 16 thereof, and thereby off the center of the sub-frame.

To the sub-frame 6 a cross bar 19 is secured, and to the sub-frame 7 a cross bar 20 is secured. Each cross bar extends forwardly of the sub-frame, and is attached to its sub-frame near the outer plow disc so as to have a lever bearing on the sub-frame, relative to its pivot. To the forward end of the cross bar 19 a U-shaped coupling member or clevis 21 is connected by the vertical bolt 22, so that it will swing horizontally on the forward end of the bar 19. To the forward end of the clevis 21 the rear end of the draft bar 23 is pivotally connected by the horizontal bolt 24, so that the draft bar will swing vertically on the clevis.

To the forward end of the cross bar 20 a U-shaped clevis or coupling 25 is pivoted by the vertical bolt 26, and to the forward end of this clevis the rear end of the draft bar 27 is pivotally connected by the horizontal bolt 28, so that said draft bar will swing vertically.

On one end of the upper channel bar or beam 5 an angle support or bar 29 is fixed, and the rear end of the pull bar 30 is pivotally connected to this support or vertical bar by means of the horizontal bolt and pivot 31. To the rear end of the pull bar 30 a plate 32 is fixed, as by welding, and this plate is formed with a series of holes 33 disposed in an arc around the pivot bolt 31. A bolt 34 is adapted to engage any one of the holes 33, and extends through the upper end of the vertical support 29 for this purpose, and serves to provide means for adjusting the cross beam or bar 5, and the sub-frames thereof, together with the plow disc, in various angular positions, with reference to the line of draft.

The pull bar 35 is similarly connected at its rear end by the pivot bolt 36 to an angle support 37, and is provided with a plate 38 for similar angular adjustment.

The forward ends of the angle pull bars 30 and 35 are secured to the sides of the box or housing 39, and in this housing the draft tongue 40 is arranged to slide horizontally. This housing is equipped with upstanding plates 41 and 42 on which the cross shaft 43 is mounted, and on this cross shaft the cam clutch roller 44 is mounted to turn, the cam roller being eccentrically mounted on the shaft.

Attached to or formed with the cam clutch roller is a lever 45, which is engaged by the upper end of a pull spring 46, the lower end of which is connected with the box or housing 39. The lower bearing surface of the cam roller is adapted to have frictional pressure engagement with the upper surface of the draft tongue. A pull cable 47 is connected at its rear end to the upper end of the lever and extends forwardly to the operating tractor, not shown.

The forward end of the draft bar 23 is adjustably connected with the rear end of the companion draft bar 23a, by means of the bolts 23b, and the forward end of the draft bar 27 is adjustably connected to the companion draft bar 27a by means of the bolts 27b. The forward end of each of the draft bars 23a and 27a is pivotally connected by the bolt 23c to the clevis 23d, which is pivotally connected by the vertical bolt 25e to the segmental extension 40a of the draft tongue 40.

The eccentric or cam roller 44 acts as a one way friction clutch and normally prevents rearward sliding movement of the housing or box 39 on the draft tongue. By backing the tongue against the resistance offered by the disc plows, the clutch cam roller will be released. By manual effort applied to the pull cable 47, the lever 45 may be swung forwardly against the pull of the spring 46 to release the cam roller from the draft tongue. When this manual effort ceases, the spring automatically returns the clutch roller to clutching position against the draft tongue.

The forward end of the draft tongue is coupled in the usual manner to a pull bar of the tractor.

The adjustable connection between the rear ends of the pull bars 30 and 35 with the cross beam 5 provides means for tilting the cross beam and the sub-frames carried thereby when the longitudinally adjustable draft bars 23 and 27 are properly adjusted.

By pivotally mounting the sub-frames 6 and 7 on the main cross beam or base 5, said sub-frames may be turned so that the plow discs are arranged with the concave faces of the plow discs on each side of the plow faced toward the concave faces of the plow discs on the other side, as in Figure 1, or with the convex faces of the plow discs on each side faced toward the convex faces of the plow discs on the other side. When the sub-frames are swung around so that the sets of plow discs are moved inwardly toward each other, the convex sides of the sets of discs will oppose each other. To set the plow discs at the angle to the line of draft desired, the tractor is reversed and the draft tongue 40 forced backwards, causing the plow discs to angle by reason of the connections between the draft tongue and the sub-frames. When the desired angle is secured, the tractor is moved forwardly, and the cam clutch roller 44 automatically engages the draft tongue 40 to hold the plow discs in the angled relation and to draw the device forwardly. When it is desired to lessen the angle of the plow discs with the line of draft, or to straighten the faces of the discs with the line of draft, the cable 47 is pulled to release the cam clutch roller 44, and the forward movement of the tractor will pull the draft tongue 40 forwardly relative to the housing 39 to effect the desired operation. As soon as the angle of the plow discs has been lessened to the desired degree, the cable 47 is released so as to allow the cam clutch roller 40 to engage the draft tongue and thereby prevent further forward movement of the latter relative to the housing 39.

When the plow discs are relatively arranged as shown in Figure 1 and set at an angle, the plow is pulled over the land to raise a ridge or levee. When the discs are reversed, as above explained, the discs can be set at an angle and used to level a ridge or levee, or to construct a ditch.

It is understood that various changes and adjustments may be made, in the construction of the details shown, and in their combination and arrangement, and that all materials useful to the construction may be employed, within the scope of the invention, as defined by the claims hereof.

Having described our invention, we claim:

1. A ridging disc plow comprising an elongated main cross beam, a short sub-frame pivoted near the inner end thereof to each end of the beam, plow discs mounted to rotate on and support each sub-frame and one end of the beam, a housing, a draft tongue slidable in the housing, pull bars connected at their forward ends to the housing and at their rear ends to the ends of the cross beam, a normally engaged one-way clutch carried by the housing and engaging the draft tongue to normally prevent forward movement of the latter relative to the housing, a draft bar connecting the rear end of the draft tongue to the outer end of each sub-frame, and means manually operable from a point remote to and forwardly of the plow for releasing said clutch.

2. A ridging disc plow comprising a main cross frame beam, a sub-frame pivoted near each end of the main frame, a plurality of plow discs mounted to turn on each sub-frame, the pivot connection between each sub-frame and the cross beam being near one end of the same, pull bars pivotally connected at their rear ends to the end portions of the cross beam, a housing connecting the forward ends of the pull bars to each other, a draft tongue sliding in the housing, an adjustable draft bar pivotally connecting the rear end of the draft tongue to each sub-frame, and an automatic clutch carried by the housing and adapted to have frictional pressure engagement with the sliding tongue to prevent the same from accidentally sliding, said clutch having a release cable extending forwardly thereof.

3. A ridging disc plow comprising a main cross beam, a sub-frame pivoted near one end thereof to each end portion of the main cross beam, a pull bar near each end of the cross beam, means connecting each pull bar to the main cross beam to permit of angular adjustment of the pull bars on the main cross beam, plow discs mounted to rotate on each sub-frame, a housing connected to the forward ends of the pull bars, a draft tongue sliding in said housing, a cam roller clutch pivoted on the housing to have clutching engagement with the draft tongue, a lever extending above said roller clutch, a spring arranged to pull the lever toward clutching position, and an adjustable draft bar connected pivotally at its rear end to each sub-frame and at its forward end to the rear end of the draft tongue.

4. The construction defined in claim 1, in combination with means to adjust said sub-frames toward or away from each other relative to the cross beam, said draft bars being adjustable in length in accordance with the adjustment of said sub-frames.

5. The construction defined in claim 1, wherein said pull-bars are pivoted to the cross-bar and the draft-bars are adjustable in length and pivoted to the draft tongue and the sub-frames, in combination with means to tiltably adjust the cross beam and sub-frames forwardly or rearwardly relative to said pull bars.

RAY OLSON.
ARCHIE OLSON.

REFERENCES CITED

The following references are of record in the file of this patent:

UNITED STATES PATENTS

| Number | Name | Date |
|---|---|---|
| 298,911 | Stoddard | May 20, 1884 |
| 1,832,049 | Peterson | Nov. 17, 1931 |
| 2,219,969 | Vaughan | Oct. 29, 1940 |
| 2,286,305 | Priestley | June 16, 1942 |